Dec. 21, 1943.   W. V. THELANDER   2,337,134
CLUTCH PLATE
Filed Jan. 29, 1940   2 Sheets-Sheet 1
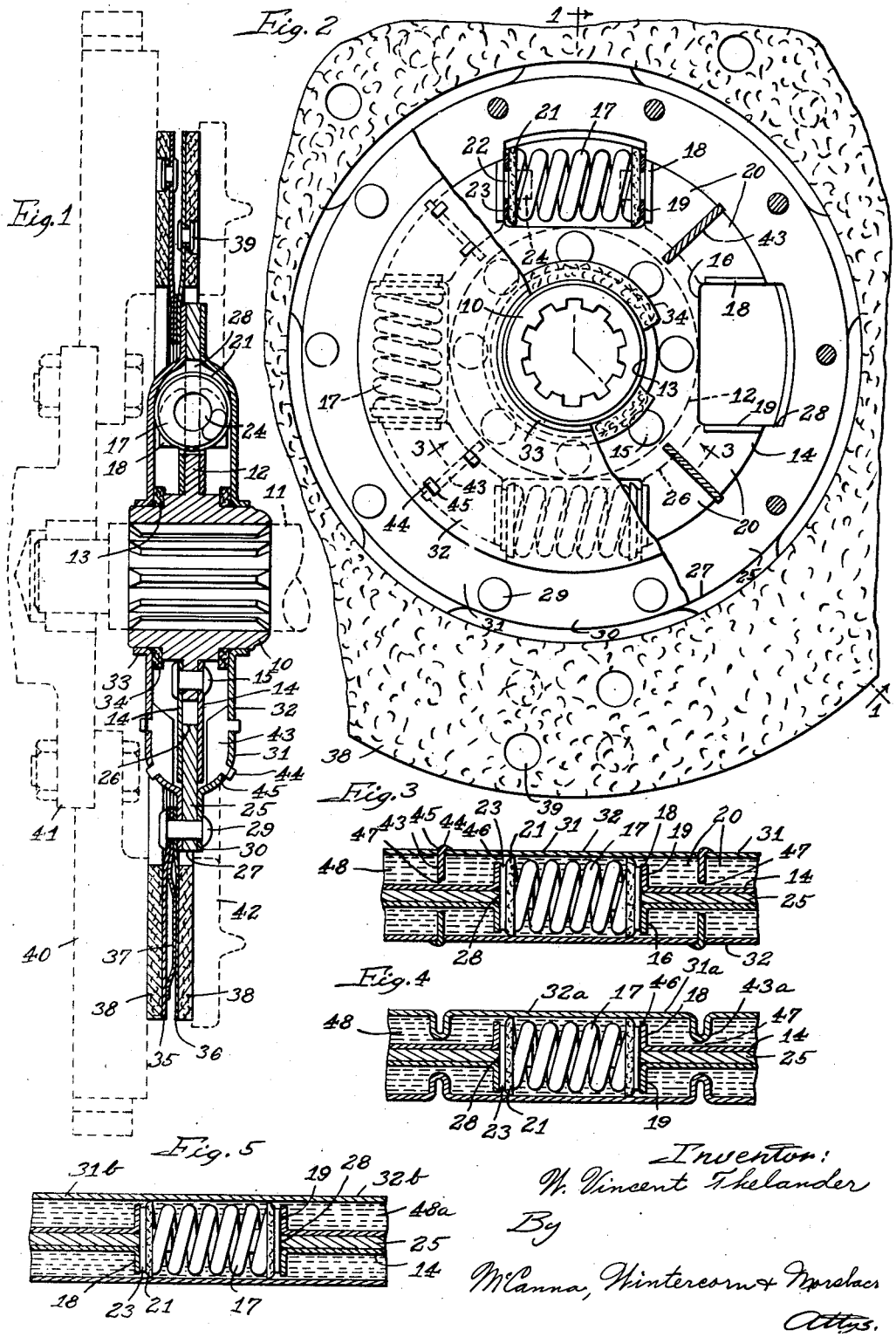
Inventor:
W. Vincent Thelander
By McCanna, Wintercorn & Norslacs
Attys.

Dec. 21, 1943.   W. V. THELANDER   2,337,134
CLUTCH PLATE
Filed Jan. 29, 1940   2 Sheets-Sheet 2
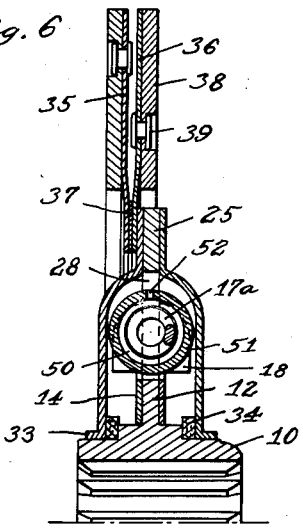
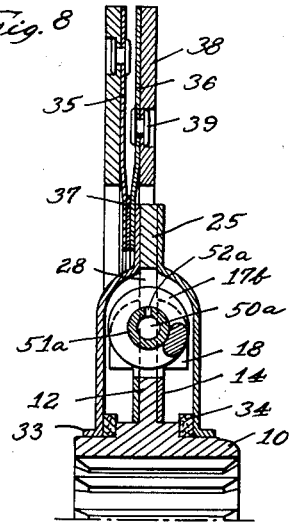
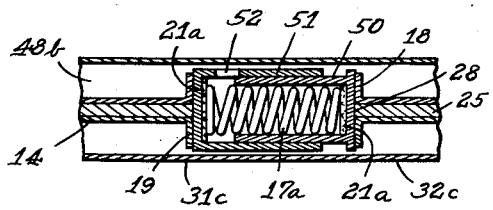
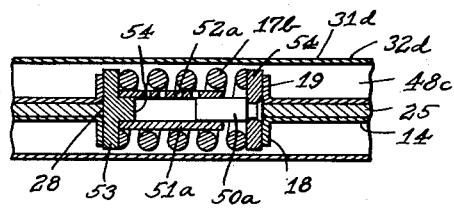
Inventor:
W. Vincent Thelander
By McCanna, Wintercorn + Morebach
Attys.

Patented Dec. 21, 1943

2,337,134

UNITED STATES PATENT OFFICE 2,337,134

CLUTCH PLATE

W. Vincent Thelander, Rockford, Ill.

Application January 29, 1940, Serial No. 316,088

22 Claims. (Cl. 192—68)

This invention relates to motion transmitting elements, and is particularly concerned with improved vibration damping or shock absorbing means, which, while especially designed for application to automotive friction clutch plates, is not limited to such use.

The principal object of the present invention is to provide a motion transmitting element having spring means between the relatively oscillatory rotating inner and outer elements and incorporating fluid damping means in the hub to eliminate the tendency for the springs and other portions of the hub structure to sound off under certain conditions in the operation of the structure. This feature of the invention is of special importance as applied to clutches for motor vehicles.

Another object is to so construct the fluid damping means that the fluid displaced in the yielding of the spring cushioning means is retarded in its return, whereby accordingly to check the recoil of the spring cushioning means and thereby smoothen the drive without recourse to any frictional braking means otherwise required, such braking means being objectionable for various reasons, the principal one being that it is subject to wear of the friction surfaces and accordingly does not give a uniform, if any, braking effect after the clutch plate or other motion transmitting element has been in service for a time.

A further object consists in the use, in the application of the invention to a clutch plate, of fairly heavy grease or oil as the fluid damping medium so as to give the desired sluggish operation while at the same time minimizing the danger of leakage, there being, however, very little likelihood of leakage due to the fact that the fluid moves radially outwardly under centrifugal force in the rotation of the clutch plate away from the central bearing of the plate members on the hub, which is the only possible outlet and which can be and is easily sealed.

The invention is illustrated in the accompanying drawings, in which—

Fig. 1 is a section through a clutch plate made in accordance with my invention, taken on the broken line 1—1 of Fig. 2 and illustrating in dotted lines the flywheel, pressure plate and driven shaft;

Fig. 2 is a fragmentary rear view of the plate showing half of the hub plate broken away so as to reveal the hub flange with two spring notches therein, the spring means being removed from one of the notches;

Fig. 3 is a sectional detail on the arcuate line 3—3 of Fig. 2;

Figs. 4 and 5 are similar sectional details showing modified or alternative constructions;

Fig. 6 is a half section of another clutch plate of modified or alternative construction embodying the piston and cylinder type checking means shown in the longitudinal sectional detail, Fig. 7, and Figs. 8 and 9 are views similar to Figs. 6 and 7, respectively, showing still another construction.

Similar reference numerals are applied to corresponding parts throughout the views.

As previously indicated, I have shown my invention as applied to the driven plate of an automotive type friction clutch. However the invention is applicable to motion transmitting elements generally, wherever there are relatively oscillatory inner and outer elements, concentrically arranged.

Referring first mainly to Figs. 1 and 2, the clutch plate shown comprises relatively rotatable inner and outer portions, the inner portion being formed by a center hub 10 splined for driving connection with the driving shaft 11 of the transmission and provided with an annular flange 12 onto which the outer portion of the plate is adapted to be assembled in concentric relation with the annular shoulders 13 provided on opposite sides of the enlarged inner portion of the flange 12 in concentric relation with the hub 10. The flange 12 has two sheet metal plates 14 riveted to the opposite sides thereof, as indicated at 15, and these plates are formed to provide a plurality of openings 16, four in the present instance, in equally circumferentially spaced relation, one for each of a plurality of spring cushioning means 17, the openings in the two plates being in register with one another and the opposite ends of each opening being defined by outwardly bent lugs 18 which, besides providing broad flat seats 19, constitute walls of damping fluid containing chambers 20, as will soon appear. Buttons 21 of fiber or other suitable non-metallic material for sound deadening effect engage the opposite ends of the coiled compression springs 17 and have reduced outer end portions 22 on which are mounted metallic wear resisting washers 23 for engagement with the seats 19 on the lugs 18. The buttons have reduced inner end portions 24 extending into the ends of the coiled springs to keep the parts in assembled relation.

A ring 25, the inner and outer peripheries 26 and 27 of which are in concentric relation with the periphery of the hub flange 12, has notches 28 cut therein in register with the openings 16 in the plates 14 and is disposed between the plates, as clearly appears in Figs. 1 and 3, for engagement of the notched portions 28 with the spring cushioning means, the drive being taken at one end of the notched portions 28 and by the seats 19 at the respectively opposite ends of the openings 16 in a manner well understood in this art. The ring 25 is riveted at circumferentially spaced points, as indicated at 29, between the peripheral flanges 30 of two sheet metal plates 31, and the joints between these parts may be and are preferably cemented or otherwise sealed against leakage of the fluid damping medium contained between the inner annular housing portions 32 of the plates 31, although if heavy enough grease is used, as contemplated with the construction of Fig. 5, as will later appear, it is probable that no cementing or sealing means may be found necessary between the riveted portions. The annular housing portions 32 extend in spaced relation to the ring 25 and plates 14 on opposite sides thereof and have central flanged openings 33 for close fitting bearing engagement with the annular shoulders 13 on the hub 10. Gaskets 34 on the shoulders 13 are held between the hub 10 and the plates 31 to seal the annular hub housing 32 against leakage of the fluid damping medium.

The outer mat-holding portion of the plate may be of any suitable construction, although I have shown a construction similar to that disclosed in my copending application Serial No. 301,869 issued as Patent #2,221,823 on Nov. 19, 1940, wherein there are two series of mat-holding segments 35 and 36 urged apart by wavy spring steel mush elements 37, the segments 35 and 36 and mush elements 37 being all riveted together against the peripheral flange 30 of one of the plates 31 by the rivets 29 previously mentioned. The segments 35 and 36 which are of thin mild steel stock, in accordance with the disclosure of the other application mentioned, have facing rings 38 of suitable composition material, usually containing asbestos, fastened thereto as by means of rivets 39. The one facing ring is adapted to engage the driving face on the back of the flywheel 40, as indicated in Fig. 1, the flywheel being shown mounted on the flange 41 on the end of the crankshaft. The other facing ring is adapted to engage the driving face on the inner side of the pressure plate indicated at 42.

The housing 32 has a plurality of radial paddle vanes 43 mounted therein on opposite sides of the plates 14 and ring 25 as by means of lugs 44 projecting through slots 45 provided in the plates 31, the projecting ends of which are bent over on the outside of the plates, as illustrated in Figs. 2 and 3. These vanes are disposed between the adjoining ends of the spring cushioning means 17 to form walls in circumferentially spaced relation to the lugs 18, which, as previously indicated, form other walls of the damping fluid containing chambers 20. The lateral walls of the chambers 20 are, of course, provided by the plates 14 and 31, and it is clear from an inspection of Fig. 3 that the lugs 18 terminate in closely spaced relation to the plates 31, as indicated at 46, and the vanes 43 terminate in closely spaced relation to the plates 14, as indicated at 47. When relative movement takes place between the inner and outer portions of the clutch plate, the springs 17 are compressed to cushion the drive and dampen vibration. At the same time, the vanes 43 move relative to the lugs 18 and accordingly displace the fluid damping medium 48 from certain of the chambers 20 into the others of said chambers and, due to the restriction of the passages 46 and 47, the fluid imposes an appreciable checking force which further cushions the drive, aiding the springs 17 and relieving these springs of some of the load. The fluid damping medium 48 is shown only in Figs. 3, 4, and 5 to avoid confusion. The recoil action of the springs 17 is also checked by the fluid damping medium as the latter returns through the restricted passages 46 and 47, so that no braking means is required for that purpose, and a smooth drive is obtained. As previously stated, braking means for resisting return of the inner and outer portions of the clutch plate to normal relationship after compression of the spring means 17 are not dependable and are generally unsatisfactory, because of the fact that the friction surfaces relied upon are subject to wear and there is usually no way of compensating for it, and consequently the braking action is not uniform and in most cases there is no appreciable braking action obtainable after the clutch plate has been in service for a time, long enough for the friction surfaces to wear away to a certain extent. The fluid damping medium 48 is usually heavy lubricating oil and this oil affords the desired checking action without any wear on the relatively movable parts, the oil serving moreover to lubricate the parts and avoid likelihood of wear. Another very important function of the fluid damping medium is its sound deadening action. I have found that where all conceivable precautions are taken to obtain a quiet operating clutch plate, even to the extent of utilizing fiber buttons, as at 21, to engage the ends of the springs so that there will be no metal-to-metal contact, the springs themselves sometimes sound off due to vibration. By surrounding the springs with fluid damping medium 48, the springs are kept from sounding off, and the same is true of all other parts with which the fluid medium 48 is in contact, the result being that the present clutch plate operates much more quietly than any of the many others with which I am familiar.

The vanes 43 may be replaced by ribs 43a, as shown in Fig. 4, struck inwardly from the plates 31a forming the housing 32a in circumferentially spaced relation to the lugs 18 on the plates 14. The ribs 43a, it will be understood, extend radially similarly to the vanes 43 and are correspondingly located. This construction will operate similarly to the construction of Figs. 1 to 3, there being substantially the same clearance at 46 and 47 to provide restricted passages for the fluid damping medium 48. On the other hand, I may, as shown in Fig. 5, provide plates 31b for the housing 32b devoid of any vanes or ribs and utilize a fluid damping medium 48a in the form of a heavy grease whose internal resistance to displacement will be sufficient to give the desired sluggish action in so far as retarding relative movement between the inner and outer portions of the clutch plate both in compression and recoil of the spring means 17 are concerned. The medium 48a, in other words, has sufficient viscosity that the resistance to relative movement is afforded by the mere agitation of the medium rather than by any actual displacement thereof, the action being comparable, for example, to what would be obtained if sponge rubber were contained in the housing 32b adhering on the one hand to the plates 31b and on the other hand to the plates 14, thus serving yieldingly to resist any relative movement of these parts by the mere distortion of the medium therebetween. The sound deadening effect with the constructions of Figs. 4 and 5 is substantially the same as with the construction of Figs. 1 to 3.

In Figs. 6 and 7 I have shown a construction similar to that disclosed and claimed in my copending application Serial No. 366,960, filed November 25, 1940 and issued as Patent #2,316,820, on April 20, 1943, including an interfitting piston 50 and cylinder 51 surrounding the spring cushioning means 17a in the housing 32c formed by plates 31c. The fluid medium 48b may be and preferably is light oil, light enough to flow into and out of the cylinder 51 through the one or more slots 52 in the wall thereof upon compression of the spring means 17a and corresponding movement of the piston 50. In that way, the fluid medium 48b cooperating with the piston 50 and cylinder 51 gives the desired restraint or checking action to help cushion the displacement between the outer and inner portions of the clutch plate and retard the recoil of the springs 17a, while at the same time affording the sound deadening effect for quiet operation, and, of course, also serve to lubricate the piston and cylinder so that wear is reduced to a minimum. However, it should be clear that the hydraulic medium 48b may be dispensed with and air can be used as the fluid medium. The ports 52 used with air as the fluid medium will doubtlessly be much narrower and/or shorter than where a hydraulic fluid medium is used, bearing in mind the fact that air is compressible and its compression may be relied upon to a certain extent for a cushioning effect, relieving the springs 17a of a portion of the load and accordingly enabling the use of lighter springs, as illustrated. The operation of this clutch plate is substantially the same as the clutch plates of Figs. 1 to 5, except that where the hydraulic fluid medium is dispensed with, its sound absorbing function is absent and the quietness of operation will depend upon the extent to which the pistons and cylinders by enclosing the springs 17a tend to deaden the sound of the springs' vibration. The washers indicated at 21a are of fiber or other sound deadening material to eliminate metal-to-metal contact between the springs and the pistons and cylinders, whereby to reduce the transmission of vibration and consequent sounding off to a minimum.

The construction of Figs. 8 and 9 closely resembles that of Figs. 6 and 7, the springs, one of which is shown at 17b, being similar to the springs 17 of Figs. 1 to 5 and encircling the cylinders 51a within which the small pistons 50a operate, the walls of the cylinders having ports 52a for inlet and outlet of air or other fluid medium 48c in the housing 32d formed by the plates 31d. A plug 53 having a reduced portion 54 to fit tightly in the end of the cylinder 51a to seal that end provides a bearing for one end of the spring 17b on its one side and is arranged to have engagement on its other side with the lugs 18 and ring 25. A washer 54 is riveted to the reduced outer end of the piston 50a, as shown, and cooperates in a similar manner with the other end of the spring and with the lugs 18 and ring 25. The operation of this construction is similar to that of Figs. 6 and 7, depending, of course, upon whether oil or air is utilized as the fluid medium 48c.

It is believed the foregoing description conveys a good understanding of the objects and advantages of my invention. The appended claims have been drawn with a view to covering all legitimate modifications and adaptations.

I claim:

1. A clutch plate comprising relatively oscillatable inner and outer members, the inner member comprising a center hub, the outer member comprising a housing surrounding the hub, and an outer plate portion rigid with the housing and adapted to have limited rotary movement therewith relative to the hub, said outer plate portion carrying friction facing material for friction drive of the plate, spring means acting between the hub and housing to resist the relative rotary movement therebetween, a liquid damping medium with which said housing is substantially filled surrounding the spring means to absorb the sound incident to vibration thereof, and fluid checking means utilizing said liquid for its working fluid for relieving the spring means of a portion of the load in the relative rotary movement and retarding the recoil action thereof.

2. A clutch plate comprising relatively oscillatable inner and outer members, the inner member comprising a center hub, the outer member comprising a housing surrounding the hub, and an outer plate portion rigid with the housing and adapted to have limited rotary movement therewith relative to the hub, said outer plate portion carrying friction facing material for friction drive of the plate, spring means in said housing for resisting relative rotary movement between the hub and outer plate portion, a heavy grease constituting fluid damping medium with which said housing is substantially filled surrounding the spring means to absorb the sound incident to vibration thereof, and checking means utilizing said grease as its working fluid to resist relative rotary movement between the hub and outer plate portion.

3. A clutch plate as set forth in claim 2, including non-metallic sound deadening means between the spring means and said hub and housing eliminating metal-to-metal contact therebetween.

4. A clutch plate comprising relatively oscillatable inner and outer members, the inner member comprising a center hub, the outer member comprising a housing surrounding the hub, and an outer plate portion rigid with the housing and adapted to have limited rotary movement therewith relative to the hub, said outer plate portion carrying friction facing material for friction drive of the plate, spring means in said housing for resisting relative rotary movement between the hub and housing, a liquid damping medium with which said housing is substantially filled, and paddle means on the walls of said housing movable with respect to the liquid in the relative rotary movement between the hub and housing to resist the relative movement in either direction.

5. A clutch plate as set forth in claim 1, including non-metallic sound deadening means between the spring means and said hub and housing eliminating metal-to-metal contact therebetween.

6. A clutch plate comprising relatively oscillatable inner and outer members, the inner member comprising a center hub, the outer member comprising a housing surrounding the hub, and an outer plate portion rigid with the housing and adapted to have limited rotary movement therewith relative to the hub, said outer plate portion carrying friction facing material for friction drive of the plate, spring means in said housing for resisting relative rotary movement between the hub and housing, a liquid damping medium with which said housing is substantially filled, and paddle means on the hub in said housing and on the walls of said housing movable relative to each other and to the liquid therein to resist relative rotary movement between the hub and housing in either direction.

7. A clutch plate comprising relatively rotatable inner and outer members, the inner member comprising a center hub, the outer member comprising a housing surrounding the hub and an outer plate portion rigid with the housing and adapted to have limited rotary movement therewith relative to the hub, said outer plate portion carrying friction facing material for friction drive of the plate, spring means acting between the hub and housing to resist the relative rotary movement therebetween, oil with which said housing is substantially filled, said spring means being immersed in said oil, fluid checking means operating with said oil as its working fluid for relieving the spring means of a portion of the load in the relative rotary movement and retarding the recoil action of said spring means, and non-metallic sound deadening means between the spring means and said hub and housing eliminating metal-to-metal contact therebetween.

8. A motion transmitting element comprising relatively oscillatable inner and outer members, the inner member comprising a center hub, the outer member comprising a housing surrounding the hub and adapted to have limited rotary movement relative to the hub, spring means in said housing for resisting relative rotary movement between the hub and housing, a liquid damping medium with which said housing is substantially filled, and a paddle projection on a wall of said housing extending inwardly into close proximity with the hub so as to provide a restricted passage therebetween for circulation of the liquid in said housing, the liquid being displaceable by said paddle upon relative rotary movement between the hub and housing in either direction.

9. A motion transmitting element comprising relatively oscillatable inner and outer members, the inner member comprising a center hub, the outer member comprising a housing surrounding the hub and adapted to have limited rotary movement relative to the hub, spring means in said housing for resisting relative rotary movement between the hub and housing, a liquid damping medium with which said housing is substantially filled, paddle projections on the hub in said housing extending outwardly into close proximity with a wall of said housing so as to provide restricted passages through which liquid displaced by the paddle projections is adapted to circulate upon relative rotary movement between the hub and housing in either direction, and other paddle projections on a wall of said housing extending inwardly into close proximity with a portion of said hub so as to provide other restricted passages through which liquid displaced by said paddles upon relative rotary movement between the hub and housing in either direction is adapted to circulate.

10. A motion transmitting element comprising relatively oscillatable inner and outer members, the inner member comprising a hub having an annular flange, and circular plates secured to the opposite sides of said flange having registering openings provided therein in circumferentially spaced relation, the outer member comprising a ring member in concentric relation with and surrounding said flange between the aforesaid plates and having openings therein in register with the aforesaid openings, and two circular housing plates having bearing engagement centrally thereof on the hub and secured peripherally to the opposite sides of said ring member, and coiled compression springs in said openings arranged to resist relative rotary movement between the hub and outer member, said springs being enclosed by said housing plates and retained thereby against displacement from said openings.

11. A motion transmitting element as set forth in claim 10, including a liquid damping medium with which the housing defined between the housing plates is substantially filled.

12. A motion transmitting element as set forth in claim 10, including a liquid damping medium with which the housing defined between the housing plates is substantially filled, the circular plates secured to the opposite sides of the hub flange having lugs bent outwardly therefrom at the opposite ends of the openings therein providing seat surfaces on their inner sides for engagement with the springs, the outer surfaces of said lugs constituting paddle means for displacing the liquid damping medium in the relative rotary movement between the hub and housing in either direction.

13. A motion transmitting element as set forth in claim 10, including a liquid damping medium with which the housing defined between the housing plates is substantially filled, and paddle projections extending inwardly from the housing plates toward the circular plates secured to the opposite sides of the hub flange for displacement of liquid damping medium upon relative rotary movement between the hub and housing in either direction.

14. A motion transmitting element as set forth in claim 10, including a heavy grease to serve as a liquid damping medium with which the housing defined between the housing plates is substantially filled.

15. A motion transmitting element as set forth in claim 10, including a heavy grease to serve as a liquid damping medium with which the housing defined between the housing plates is substantially filled, the circular plates secured to the opposite sides of the hub flange having lugs bent outwardly therefrom at the opposite ends of the openings therein providing seat surfaces on their inner sides for engagement with the springs, the outer surfaces of said lugs constituting paddle means for displacing the liquid damping medium in the relative rotary movement between the hub and housing in either direction.

16. A clutch plate comprising relatively oscillatable inner and outer members, the inner member comprising a center hub, the outer member comprising a housing surrounding the hub, and an outer plate portion rigid with the housing and adapted to have limited rotary movement therewith relative to the hub, said outer plate portion carrying friction facing material for friction drive of the plate, spring means in said housing for resisting relative rotary movement between the hub and outer plate portion, a heavy grease constituting a fluid damping medium with which said housing is substantially filled surrounding the spring means to absorb the sound incident to vibration thereof, and paddle means acting between the housing and hub in the fluid damping medium to increase resistance to relative movement in either direction.

17. A clutch plate comprising relatively rotatable inner and outer members, the inner member comprising a center hub, the outer member comprising a housing surrounding the hub and an outer plate portion rigid with the housing and adapted to have limited rotary movement therewith relative to the hub, said outer plate portion carrying friction facing material for friction drive of the plate, spring means acting between the hub and housing to resist the relative rotary movement therebetween, oil with which said housing is substantially filled, said spring means being immersed in said oil, and fluid checking means operating with said oil as its working fluid for relieving the spring means of a portion of the load in the relative rotary movement and retarding the recoil action of said spring means.

18. A motion transmitting element comprising relatively oscillatable inner and outer members, the inner member comprising a center hub, the outer member comprising a housing surrounding the hub and adapted to have limited rotary movement relative to the hub, spring means in said housing for resisting relative rotary movement between the hub and housing, a liquid damping medium with which said housing is substantially filled, and a paddle projection on the hub in said housing extending outwardly into close proximity with a wall of said housing so as to provide a restricted passage therebetween for circulation of the liquid in said housing, the liquid being displaced by said paddle upon relative rotary movement between the hub and housing in either direction.

19. A motion transmitting element comprising relatively oscillatable inner and outer members, the inner member comprising a hub having an annular flange, and circular plates secured to the opposite sides of said flange having registering openings provided therein in circumferentially spaced relation in the outer peripheral portion thereof, the outer member comprising a ring member in concentric relation with and surrounding said flange between the circular plates and having openings provided therein in register with the aforesaid openings, and two circular housing plates having bearing engagement centrally on the hub and secured peripherally to the opposite sides of said ring member, coiled compression springs in said openings arranged to resist relative rotary movement between the hub and outer member, said springs being enclosed by said housing plates and retained thereby against displacement from said openings, the housing defined between the housing plates containing a liquid damping medium, and sealing means for said housing to prevent leakage of said liquid damping medium comprising gasket rings surrounding the hub and compressed between the flange and the housing plates.

20. A motion transmitting element comprising relatively oscillatable inner and outer members, the inner member comprising a hub having an annular flange and annular shoulders on opposite sides of said flange in concentric relation with the hub and flange, and circular plates secured to the opposite sides of said flange and centered on said annular shoulders in concentric relation to the hub and having registering openings provided therein in circumferentially spaced relation in the outer peripheral portion thereof, the outer member comprising a ring member in concentric relation with and surrounding said flange between the circular plates and having openings provided therein in register with the aforesaid openings, and two circular housing plates having bearing engagement centrally on the hub and secured peripherally to the opposite sides of said ring member, coiled compression springs in said openings arranged to resist relative rotary movement between the hub and outer member, said springs being enclosed by said housing plates and retained thereby against displacement from said openings, the housing defined between the housing plates containing a liquid damping medium, and sealing means for said housing to prevent leakage of said liquid damping medium comprising gasket rings surrounding the hub and compressed between the annular shoulders on the hub and the housing plates.

21. A motion transmitting element, comprising relatively oscillatable inner and outer members, the inner member comprising a center hub, the outer member comprising a housing surrounding the hub adapted to have limited rotary movement relative to the hub, spring means acting between the hub and housing to resist the relative rotary movement therebetween, a liquid damping medium with which said housing is substantially filled surrounding the spring means to absorb the sound incident to vibration thereof, and fluid checking means utilizing said liquid for its working fluid for relieving the spring means of a portion of the load in the relative rotary movement and retarding the recoil action thereof.

22. A motion transmitting element as set forth in claim 21, including non-metallic sound deadening means between the spring means and said hub and housing eliminating metal-to-metal contact therebetween.

W. VINCENT THELANDER.